Feb. 3, 1959 R. B. BROOKS 2,872,565

WELDING METHOD

Filed April 28, 1955

INVENTOR.
ROBERT B. BROOKS

BY [signature]

ATTORNEY 2,872,565

WELDING METHOD

Robert B. Brooks, St. Louis Park, Minn., assignor to Minneapolis-Honeywell Regulator Company, Minneapolis, Minn., a corporation of Delaware Application April 28, 1955, Serial No. 504,543

11 Claims. (Cl. 219—117)

This invention relates generally to electric welding and is more particularly directed to a method of arc welding at the intersection of a pair of crossing, current conducting, metallic elements.

This invention is more particularly adapted to be used in providing connections between circuits in the art of printed wiring where it is desirable to interconnect conductors in one circuit to conductors in another circuit while providing insulation between the two circuits at all other points.

It is therefore an object of this invention to provide a method of producing a welded connection between crossing, current conducting, metallic elements.

Figures 1, 2:
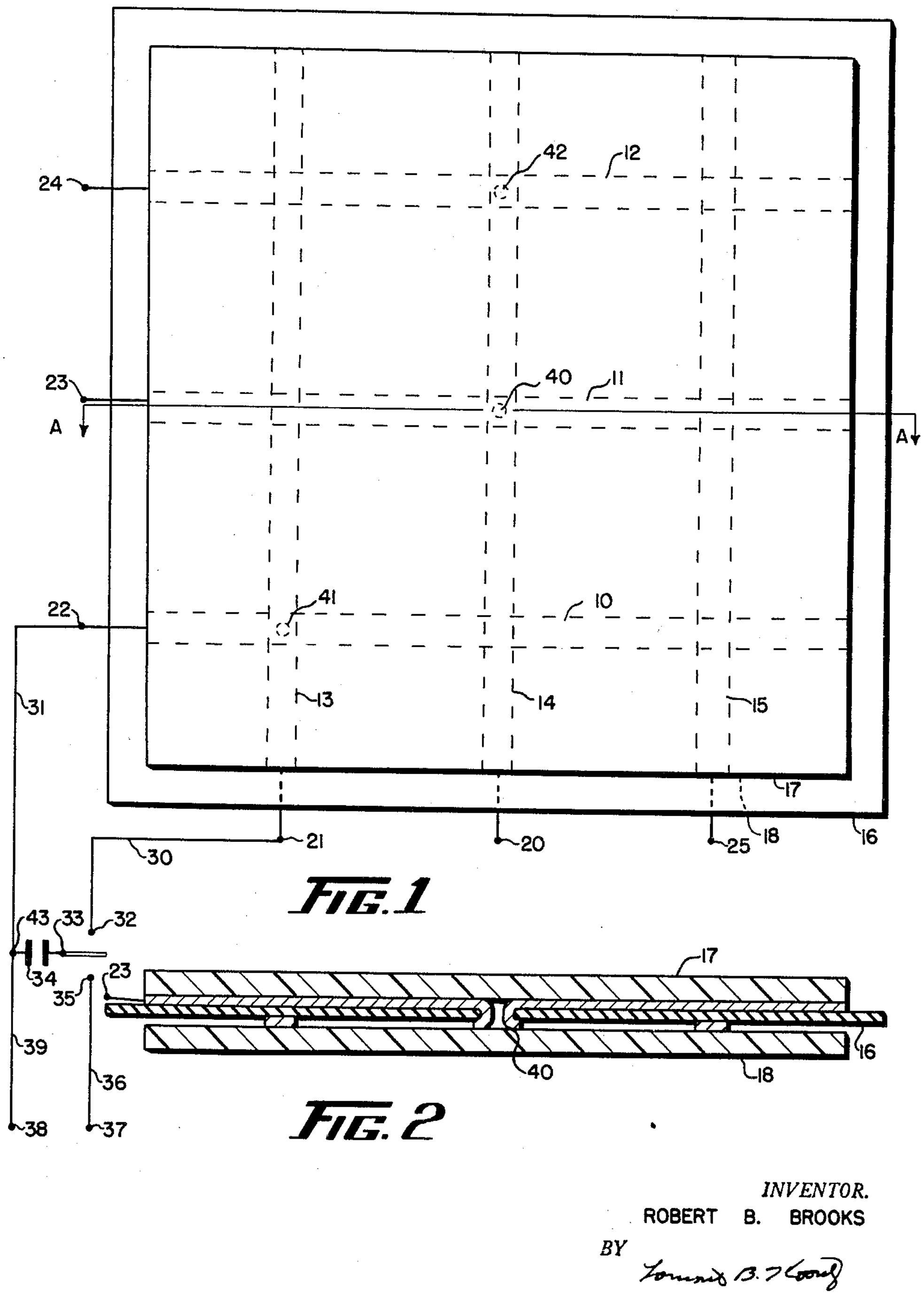
Figure 1 shows a plan view of a pair of printed wiring cards.
Figure 2 is a section taken in the line A—A of Figure 1, the thickness being exaggerated.

Referring now to the drawings, a plastic base 17 has flat metallic conductors 10, 11 and 12 firmly attached to it, and plastic base 18 has conductors 13, 14 and 15 firmly attached thereto, and a thin sheet of suitable dielectric material 16, is arranged between said conductors and said bases. A terminal 20 provides an electrical connection to conductor 14 on base 18, a terminal 21 provides an electrical connection to conductor 13 on base 18 and a terminal 25 provides an electrical connection to conductor 15 on base 18. Terminal 22 is electrically connected to conductor 10 on base 17, terminal 23 is electrically connected to conductor 11 on base 17 and terminal 24 is electrically connected to conductor 12 on base 17.

A capacitor 34, connected to single pole double throw switch 33 is used as a source of electrical energy, it being charged to a suitable potential by a circuit including terminal 37, lead 36, terminal 35 on switch 33, capacitor 34, terminal 43, lead 39 and terminal 38. Terminals 37 and 38 are provided for connection to a suitable source of direct current (not shown). It is to be understood that capacitor 34 is of the proper capacity to provide a charge of sufficient energy and duration to allow formation of a good welded joint. The capacitor 34 may be discharged through a circuit including terminal 32 on switch 33, lead 30, terminal 21, conductor 13 of base 18, intersection 41, conductor 10 on base 17, terminal 22, lead 31, and terminal 43.

The operation of my invention as shown in the drawing is as follows; assuming a connection is desired at junction 41 of conductor 13 on plastic base 18 and conductor 10 on plastic base 17, the plastic bases having the conductors attached thereto are assembled on opposite sides of a thin sheet of suitable dielectric material 16, and electrical connections are provided to terminals 21 and 22 of conductors 10 and 13. A suitable charge is placed on capacitor 34 by connecting it to a source of direct potential through switch 33, terminal 35; capacitor 34 is then connected across terminals 21 and 22 through switch 33, terminal 32, and the charge on the capacitor is impressed across conductors 10 and 13. Since the point of greatest potential concentration occurs at the intersection of the two conductors shown by reference character 41 and the charge on the capacitor is of a suitable value to cause the thin dielectric sheet 16 to break down, a current will flow from capacitor 34 through switch 33 to terminal 32, lead 30, terminal 21, conductor 13, through the hole in dielectric sheet 16 caused by the breakdown, to conductor 10, terminal 22, lead 31 and back to capacitor 34 through terminal 43. Since the charge on capacitor 34 has been selected to provide sufficient energy to cause an arc to form at intersection 41 of conductors 10 and 13, a welded bond is effected between the two conductors at junction 41. It is to be noted that as the arc melts the metal in the conductors at the point of intersection, the molten metal tends to follow the form of the hole in the sheet of dielectric material at the point of intersection and then form a hole in the connecting conductor material. The sides of the hole will be composed of the metal melted by the formation of the arc.

Figure 2 shows a cross section of Figure 1 along section line A—A. The same reference numerals are used for corresponding portions of the drawing. A second welded connection 40 is shown in cross section to illustrate the approximate form of the connection after the weld has been effected. This weld is made in the same manner as the weld at junction 41 with the capacitor 34 connected across terminals 20 and 23 to provide an electrical connection to conductors 14 and 11, respectively.

It is to be understood that the source of electrical energy need not be the charge on a capacitor but may be any source of direct potential which can be controlled as to duration and magnitude to impress a suitable charge of electrical energy across the junction point of the conductors sought to be connected.

It should likewise be apparent that the sheet of dielectric material utilized to separate the conductors may be of any material having the desired insulating properties and breakdown characteristic which will provide the desired weld. A suitable material might be a dielectric material impregnated with particles of conductive material or a thin sheet of a plastic known commercially as 25 "Mylar" A. Also, a welded connection between two flat metallic crossing conductors is possible using only a sheet of ordinary brown wrapping paper as the dielectric material if the proper value has been chosen for the electrical charge.

It will be understood that modifications may be made in the design and arrangement of the parts without departing from the spirit of the invention.

What is claimed is:

1. In the assembly of electrical circuits wherein printed wiring is used, the method of interconnecting two or more individual circuits at intersections of conductors included in the several circuits which comprises the placing of a thin dielectric material between the several circuits and applying a pulse of electrical energy, across the extremities of said conductors, to cause said dielectric material to break down and allow current to flow so as to effect a permanent welded bond between said conductors.

2. A method of interconnecting intersecting conductors of a plurality of independent circuits which comprises the placing of said conductors in intimate contact with a sheet of dielectric insulating material separating said conductors and causing a pulse of electrical energy of sufficient magnitude to be applied across said conductors so as to cause said dielectric material to break down and allow sufficient current conduction to effect a permanent welded bond between said conductors.

3. In a manufacture of electrical circuits the method of permanently joining at selective points, a plurality of crossing conductors comprising; dielectric means separating said conductors to be joined; means for supplying a pulse of current of suitable magnitude; and means for connecting said means for supplying a pulse of electric current in circuit with said crossing conductors so as to cause said dielectric to break down at the point of intersection and allow current to flow between the said conductors thereby providing a permanent welded connection between said conductors.

4. In the assembly of electrical circuits the method of permanently joining, at determinable intersections, selected pairs of intersecting conductors which comprises the placing of a sheet of dielectric material between said circuits to be assembled, and impressing a pulse of electrical energy of sufficient magnitude across said intersecting conductors so as to cause said dielectric material to break down at the point of intersection and allow current flow in order to provide a welded, permanent bond between said conductors.

5. A method of permanently joining a pair of crossed conductors at a selected point comprising; positioning dielectric means between said conductors which are to be joined; supplying an electrical current of sufficient potential and energy to cause said dielectric means to break down and cause a formation of an arc; and connecting said source of energy across said conductors to be joined so as to effect a permanent welded junction at the point of intersection of said conductors and continuing the supply of electric current for sufficient time to weld the crossed conductors together through the hole formed by breakdown of the dielectric at the point of crossing of the conductors.

6. A method of permanently joining a pair of crossed conductors comprising; positioning dielectric means between said conductors which are to be joined; supplying an electrical current to said crossed conductors of sufficient potential and energy to cause said dielectric means to break down and cause formation of an arc; and continuing the supply of electric current for a sufficient time to weld the crossed conductors together through the hole formed by break down of the dielectric at the point of intersection of the conductors.

7. A method of effecting a permanent welded connection between two crossing metallic members, where said metallic members are relatively flat, at the point of intersection of said metallic members which comprises the placing of a sheet of thin insulating material between said metallic members and supplying electrical energy of sufficient magnitude to cause said dielectric to break down at the point of intersection and allow a current flow, through said insulating material, of sufficient magnitude and duration so as to cause an arc to form at said intersection whereby the metal at said intersection is melted and flows together to effect a permanent welded bond.

8. A method of permanently joining intersecting current conducting metallic elements comprising; separating said metallic elements by a thin dielectric material; supplying an electrical energy pulse of sufficient magnitude to cause said dielectric means to break down at the point of intersection of said elements and allow current to flow between said metallic elements so as to effect a welded connection at the intersecting of said metallic elements.

9. A method for providing an electrical connection at the intersection of a pair of intersecting metallic current conductors which comprises the placing of a thin sheet of dielectric material between said conductors to be connected, charging a capacitor to a high potential from a suitable source of direct current potential, and connecting said capacitor across the conductors to be joined so as to cause said dielectric material to break down at the point of intersection and allow formation of an arc of sufficient magnitude to permanently weld the conductors at the point of intersection.

10. The method of connecting a pair of flat, metallic current conducting elements, at an intersection of said current conducting elements which comprises the placing of a thin sheet of dielectric material between said conductors, providing means to hold said conductors and said sheet of dielectric material in close proximity, providing a source of electric charge of sufficient energy and duration, and connecting said source to said conductors so as to present a charge of potential at the intersection of said conductors which is sufficient to cause said dielectric material to break down and allow formation of an electric arc between said conductors and thereby effect a welded connection at the point of intersection of said conductors.

11. In the assembly of electrical circuits, each composed of a plurality of discrete coplanar printed conductors, the method of interconnecting said conductors at intersections thereof which comprises the placing of a plurality of coplanar conductors on opposite sides of a sheet of dielectric insulating material and causing a pulse of electrical energy of sufficient magnitude to be applied across intersecting conductors so as to cause said dielectric material to break down and allow sufficient current to flow through said dielectric material to effect a permanent welded bond between said conductors.

References Cited in the file of this patent

UNITED STATES PATENTS

| | | |
|---|---|---|
| 1,652,634 | Oliver | Dec. 13, 1927 |
| 1,915,984 | Dowling | June 27, 1933 |
| 2,050,393 | Stoddard | Aug. 11, 1936 |
| 2,066,511 | Arlt | Jan. 5, 1937 |
| 2,350,532 | Richardson | June 6, 1944 |
| 2,350,601 | Frank et al. | June 6, 1944 |
| 2,400,921 | Dow et al. | May 28, 1946 |
| 2,649,513 | Luhn | Aug. 18, 1953 |